US008106753B2

(12) United States Patent
Vian et al.

(10) Patent No.: US 8,106,753 B2
(45) Date of Patent: Jan. 31, 2012

(54) DETERMINING AND PROVIDING VEHICLE CONDITIONS AND CAPABILITIES

(75) Inventors: John L. Vian, Renton, WA (US); Stefan R. Bieniawski, Seattle, WA (US); Paul E. Pigg, Seattle, WA (US); Gregory J. Clark, Seattle, WA (US); Emad W. Saad, Renton, WA (US); David J. Halaas, Buckley, WA (US)

(73) Assignee: The Boeing Company, Chicago, IL (US)

( * ) Notice: Subject to any disclaimer, the term of this patent is extended or adjusted under 35 U.S.C. 154(b) by 641 days.

(21) Appl. No.: 12/199,435

(22) Filed: Aug. 27, 2008

(65) Prior Publication Data

US 2010/0052948 A1 Mar. 4, 2010

(51) Int. Cl.
*B60Q 1/00* (2006.01)

(52) U.S. Cl. ........................................ 340/438; 340/439
(58) Field of Classification Search .................. 340/438, 340/439
See application file for complete search history.

(56) References Cited

U.S. PATENT DOCUMENTS

| 5,001,638 | A | 3/1991 | Zimmerman et al. |
| 5,111,402 | A | 5/1992 | Brooks et al. |
| 6,480,102 | B1* | 11/2002 | Miller et al. ........................ 342/70 |
| 6,658,355 | B2* | 12/2003 | Miller et al. ........................ 701/301 |
| 6,691,007 | B2 | 2/2004 | Haugse et al. |
| 6,720,920 | B2 | 4/2004 | Breed et al. |
| 6,892,216 | B2* | 5/2005 | Coburn et al. .................... 709/200 |
| 6,928,345 | B2 | 8/2005 | Quinn |
| 7,236,861 | B2* | 6/2007 | Paradis et al. .................... 701/24 |
| 7,765,038 | B2* | 7/2010 | Appleby et al. .................. 701/23 |
| 2003/0034902 | A1 | 2/2003 | Dickau |
| 2006/0142903 | A1 | 6/2006 | Padan |
| 2006/0184291 | A1* | 8/2006 | Paradis et al. .................... 701/23 |
| 2006/0184292 | A1* | 8/2006 | Appleby et al. .................. 701/23 |
| 2006/0235584 | A1* | 10/2006 | Fregene et al. .................. 701/23 |
| 2007/0012817 | A1* | 1/2007 | Parmley, Sr. ..................... 244/2 |
| 2007/0135978 | A1* | 6/2007 | Kim et al. ........................ 701/29 |
| 2008/0033684 | A1 | 2/2008 | Vian et al. |

FOREIGN PATENT DOCUMENTS

EP 407 179 A 1/1991

(Continued)

OTHER PUBLICATIONS

White, Edward V.; Progress in Structural Health Management for Aerospace Vehicles; Smart Structures and Systems, Boeing—Phantom Works; slide show presentation; Mar. 27-29, 2001.

(Continued)

*Primary Examiner* — Travis Hunnings
(74) *Attorney, Agent, or Firm* — Harness, Dickey & Pierce, P.L.C.

(57) ABSTRACT

A transponder module for vehicles. The module has a substantially universal vehicle sensor input interface capable of receiving sensor input from different types of vehicle sensors and from different types of vehicles. One or more processors and memory, in real time, receive vehicle sensor input data via the input interface. Based on a vehicle type stored in the memory, the processor(s) use the sensor input data to determine conditions of subsystems the vehicle. Based on the determined conditions, the processor(s) determine performance capabilities of the vehicle. The transponder module outputs information as to the stored vehicle type, determined conditions, and vehicle performance capabilities.

9 Claims, 8 Drawing Sheets

FOREIGN PATENT DOCUMENTS

GB 2 021 261 A 11/1979

OTHER PUBLICATIONS

Akdenia, Aydin, Trego, Angela, Haugse, Eric; Structural Health Management Techonology Implementation on Commercial Airplanes; The Seventh Joint DoD/FAA/NASA Conference on Aging Aircraft, New Orleans, LA, Sep. 8-11, 2003; slide show presentation.

Arie Egozi, "Israel to expand UAV, helicopter safety measures"; Flight International; May 14, 2008; http://www.flightglobal.com/articles/article.aspx?liArticleID=223678&PrinterFriendly=true.

\* cited by examiner

DETERMINING AND PROVIDING VEHICLE CONDITIONS AND CAPABILITIES

FIELD

The present disclosure relates generally to vehicle systems and more particularly (but not exclusively) to providing information substantially in real time as to vehicle conditions and capabilities, e.g., for use in vehicle control and/or mission planning.

BACKGROUND

The statements in this section merely provide background information related to the present disclosure and do not necessarily constitute prior art.

Transponders are commonly used to communicate information from aircraft, automobiles and trucks and ships. For example, mode-S aircraft transponders are installed on many types of aircraft to communicate basic identification and location information. Automatic Identification System (AIS) ship transponders may provide identification, ship type, position, course, and speed. Automobile RFID systems may be used in trucks and cars, e.g., to provide identification information for tracking and toll collection.

SUMMARY

The present disclosure, in one implementation, is directed to a transponder module for vehicles. The module has a substantially universal vehicle sensor input interface capable of receiving sensor input from a plurality of different types of vehicle sensors and from a plurality of different types of vehicles. One or more processors and memory are configured to, in real time: receive vehicle sensor input data via the input interface; based on a vehicle type when stored in the memory, use the sensor input data to determine conditions of a plurality of subsystems of a vehicle of the stored vehicle type; and based on the determined conditions, determine a plurality of performance capabilities of a vehicle of the stored vehicle type. The transponder module is further configured to output information as to the stored vehicle type, determined conditions, and vehicle performance capabilities.

In another implementation, the disclosure is directed to a system for determining vehicle conditions and capabilities. The system includes a vehicle having a plurality of sensors and a transponder module connected with the sensors via a substantially universal vehicle sensor input interface of the module. The transponder module has one or more processors and memory configured to, in real time: receive vehicle sensor input data via the input interface. Based on a type of the vehicle stored in the memory, the transponder module uses the sensor input data to determine conditions of a plurality of subsystems of the vehicle. Based on the determined conditions, the transponder module determines a plurality of performance capabilities of the vehicle. The transponder module is further configured to output information as to the stored vehicle type, determined conditions, and vehicle performance capabilities. The system further includes one or more control systems configured to perform one or more control functions based on the transponder module output information.

In another implementation, the disclosure is directed to a vehicle including a plurality of sensors, an integrated vehicle health management (IVHM) system, and a transponder module. The transponder module has a vehicle sensor input interface that receives sensor input from a plurality of different sensors of the vehicle. One or more processors and memory of the transponder module are configured to, in real time, receive sensor input data from the vehicle via the input interface, use the sensor input data to determine conditions of a plurality of subsystems of the vehicle, and based on the determined conditions and on data provided by the IVHM system, determine a plurality of performance capabilities of the vehicle.

In yet another implementation, the disclosure is directed to a method of providing conditions and capabilities of a vehicle. The method is performed by a transponder module of the vehicle. The method includes receiving sensor information in real time from a plurality of sensors of the vehicle. Based on a type of the vehicle stored in a memory, the sensor information is used to determine current and/or projected conditions of a plurality of subsystems of the vehicle. Based on the determined conditions and on data from an integrated vehicle health management (IVHM) system of the vehicle, a plurality of current and/or projected capabilities of the vehicle are determined.

In still another implementation, the disclosure is directed to a method of using one or more vehicles to perform a mission. The method includes receiving, from a transponder module of each of the vehicle(s), information describing a plurality of current subsystem conditions and a plurality of current capabilities of each vehicle. The information is used in real time to update conditions and capabilities for each vehicle in a mission capabilities matrix. Based on the updated matrix, one or more of the following are performed: control of at least a component of one of the vehicle(s); modification of a task of one of the vehicle(s); and modification of the mission.

In yet another implementation, the disclosure is directed to a system for performing a mission. The system includes a plurality of vehicles to which one or more tasks of the mission are assigned. Each vehicle has a transponder module configured to provide information in real time describing a plurality of current subsystem conditions and a plurality of current capabilities of the vehicle. A mission control system has at least one processor and memory configured to receive the information in real time from the vehicle transponder modules, and based on the information, to perform one or more functions in real time to optimize the mission.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
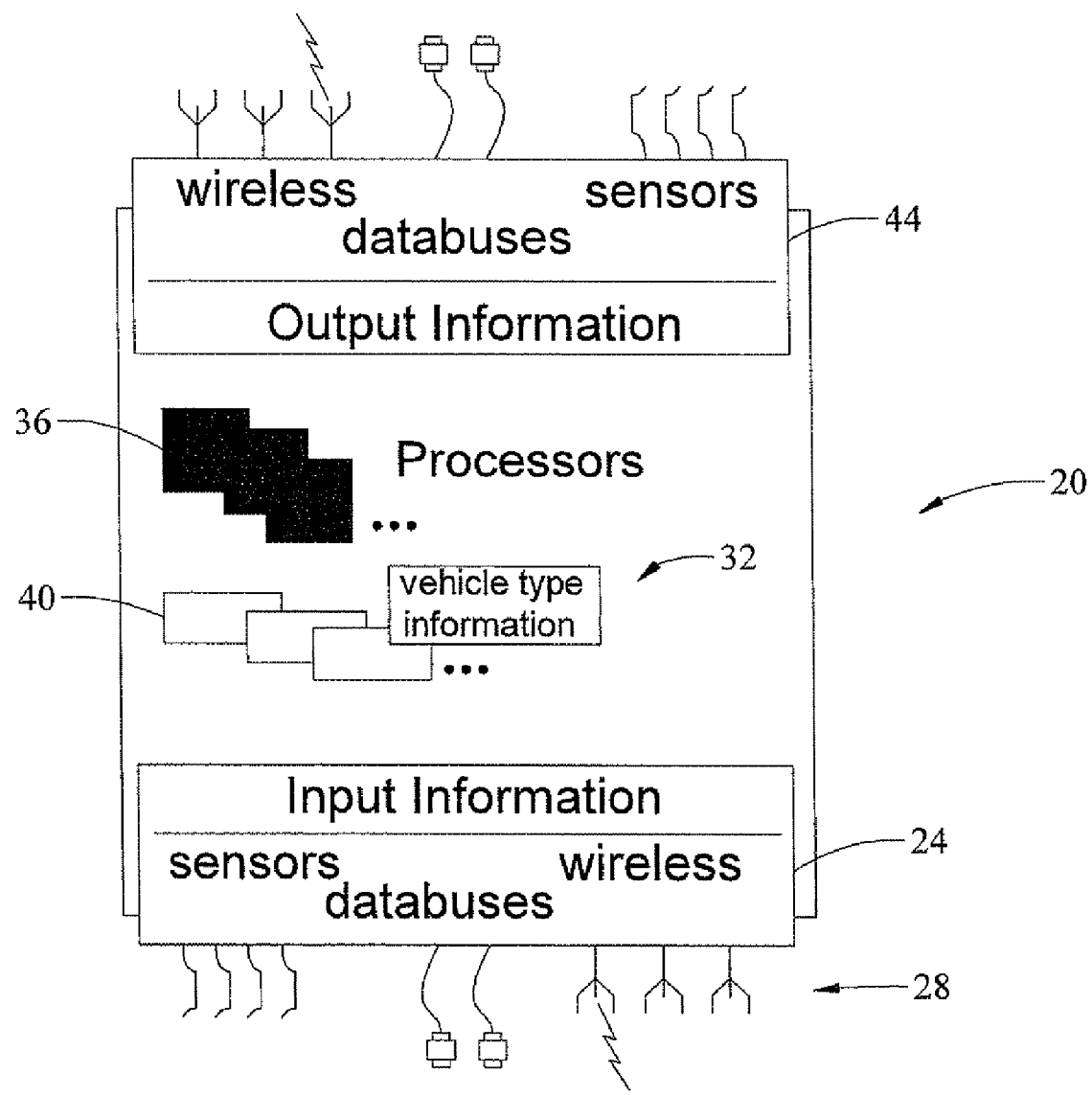
FIG. 1 is a diagram of a transponder module in accordance with one implementation of the disclosure.

The following description is merely exemplary in nature and is not intended to limit the present disclosure, application, or uses. It should be understood that throughout the drawings, corresponding reference numerals indicate like or corresponding parts and features.

The term "transponder" is used in the disclosure and the claims to refer to an apparatus, system, module or device that may provide information substantially continuously, periodically, and/or occasionally. Although a "transponder" in accordance with various implementations may provide information in response to a poll, query or other request, it may additionally or alternatively provide information in the absence of a poll, query or other request.

The present disclosure, in various implementations, is directed to a transponder module and system configured to determine and communicate vehicle conditions and capabilities. Configurations of the transponder module and system can be implemented in relation to substantially all types of vehicles in which sensor information is provided, including but not limited to air, land, space, and/or water vehicles. In various implementations, changing vehicle conditions and capabilities are determined in realtime. Information as to the determined vehicle conditions and/or capabilities may be provided to a control system on board the subject vehicle and/or to one or more off-board systems, e.g., to system(s) used by mission planners to plan and/or execute a mission that includes use of the vehicle.

In various configurations, sensors of a vehicle may be connected with a transponder module to form a system for determining and communicating vehicle condition and capabilities. One configuration of a transponder module is indicated generally in FIG. 1 by reference number 20. The module 20 includes a vehicle sensor input interface 24 having a plurality of wired and wireless sensor interfaces indicated generally as 28. The input interface 24 is capable of receiving sensor input from a plurality of different types of vehicle sensors and from a plurality of different types of vehicles. In some configurations the input interface 24 is substantially universal. The interface 24 is capable of communicating, for example, via discrete, analog, wired and/or wireless signals and/or via data bus. In various configurations, the module 20 is designed to be installed on substantially any type of vehicle. It should be noted, however, that implementations are contemplated in which an input interface may be specifically configured for a particular vehicle type.

The module 20 includes a computing system 32 having one or more processors 36 and memory 40. Some of the memory 40 is static memory for storage of, e.g., information corresponding to a vehicle in which the module 20 is to be configured. When the module 20 is configured in a given vehicle, a vehicle type and vehicle systems information for the given vehicle are stored in the memory 40. When, e.g., the given vehicle is in operation, the processor(s) 36 and memory 40 receive vehicle sensor input data via the input interface 24 in real time. The processor(s) 36 use, e.g., the sensor input data, vehicle type and vehicle system information to determine conditions, in real time, of a plurality of subsystems of the given vehicle. Based on the determined conditions, the processor(s) 36 determine real-time and/or future performance capabilities of the given vehicle. The term "real time" is used to mean essentially instantaneous.

The computing system 32 also includes, e.g., dynamic memory, software programs for processing input data to compute conditions of vehicle subsystems and components, and software programs that process input data and computed vehicle condition information to compute capabilities of a vehicle. The processor(s) 36 may use software agents and may execute decision tables, neural networks, physical models, and perform other computational functions in determining vehicle conditions and/or capabilities as further described below.

The module 20 also includes an output interface 44 for outputting information via wired or wireless communication devices, for example, to one or more systems or subsystems that may or may not be onboard a vehicle. In various implementations the output communication interface 44 is modular and supports various combinations of commonly used optical, wired, and/or wireless methods. Such methods include, e.g., optical and wire point-to-point and/or multiplexed communication systems and protocols, and bluetooth, WiFi, WiMAX, cellular, satellite, and other wireless communication methods. Output information that may be determined and communicated by the module includes 1) vehicle type information, 2) vehicle condition information, and/or 3) vehicle capabilities information. The module 20 communicates component conditions and vehicle capabilities to other systems, e.g., to enable maintenance planning, mission planning, or any combination thereof. In some implementations, various functions performed in determining vehicle conditions and capabilities may be performed off-board a vehicle, e.g., by processors of an off-vehicle management system.

The module 20 may be electrically powered in various ways, e.g., by a vehicle in which the module 20 is included. Additionally or alternatively, power may be provided via a self-contained component, using any of a plurality of combinations of energy storage and/or energy harvesting devices. In some implementations, to install the module 20 in a vehicle, a "personality" module providing at least (a) a type of the vehicle and (b) information describing a suite of sensors associated with the vehicle type is loaded to static memory 40 of the module 20. The input and output interfaces 24 and 44 are connected respectively with appropriate input sensors and output devices in the vehicle. In some configurations, the module 20 is included in a single line-replaceable unit (LRU) of the vehicle.

Examples of vehicle types relative to which the module 20 may be installed include, without limitation, fixed-wing flight vehicles, rotorcraft flight vehicles, wheeled land vehicles, tracked land vehicles, hovercraft land vehicles, surface watercraft, underwater watercraft, reusable spacecraft, expendable spacecraft, orbiter spacecraft, rover spacecraft, and other or additional categories and classes of vehicles.

In various implementations, the processor(s) 36 use vehicle sensor input information to determine current and/or predicted future conditions of vehicle components. Conditions of vehicle components can vary dependent on, e.g., component age, operating environment, and/or actual component usage. Vehicle component condition information determined by the processor(s) 36 can include but is not necessarily limited to the following: battery remaining useful life in terms of time, battery remaining useful life in terms of mission task cycles, fuel quantity, vehicle weight, structure health in terms of number of remaining cycles, structure health in terms of maximum load capacity, structure health in terms of thermal limits, remaining useful life of various subsystem components in terms of time, remaining useful life of various subsystem components in terms of cycles, component failures, changes in aerodynamic performance parameters, changes in energy usage rate, and other parameter measurements and computed predictions that provide indication of system conditions.

Vehicle component conditions may be determined, for example, using model-based and/or non-model-based algorithms, including but not limited to those commonly used in the practice of prognostic vehicle health management. Such algorithms may use, e.g., design reliability data, usage history, actual measured component operating parameters, planned future use, etc., individually and/or in combination(s). Algorithms may be implemented using traditional and/or agent-based software programming methods that allow serial and/or parallel processing. Standard database schemas and information models may be used in implementations of the transponder module 20. In such manner, e.g., software libraries may be used, software libraries may be loaded to hardware, and appropriate connections to external inputs and outputs may be established.

Current and predicted future conditions of vehicle components can be determined and provided, for example, to optimize the planning of maintenance of the vehicle. Vehicle capabilities may be determined by the processor(s) 36 using, e.g., vehicle design specifications, installed subsystem configuration information, vehicle operating conditions, vehicle and subsystems state, component conditions, etc., individually and/or in combination(s). Various model-based and/or non-model-based algorithms and methods, including but not limited to those commonly used in the practice of engineering, may be used to determine vehicle capability information. Such algorithms and methods may be implemented using traditional and/or agent-based software programming methods that allow sequential and/or parallel processing.

Vehicle capability information can include but is not necessarily limited to the following: maximum acceleration, maximum braking (deceleration) rate, maximum speed, minimum speed, minimum turn radius, maximum range, maximum endurance, mission on-board sensors type (e.g., types available under current conditions), mission off-board sensors type (e.g., types available under current conditions), mission sensors performance, maximum payload weight, payload type, communications system type (e.g., types available under current conditions), maximum climb rate, and other or additional static and dynamic vehicle performance metrics and/or limits.

Figure 2:
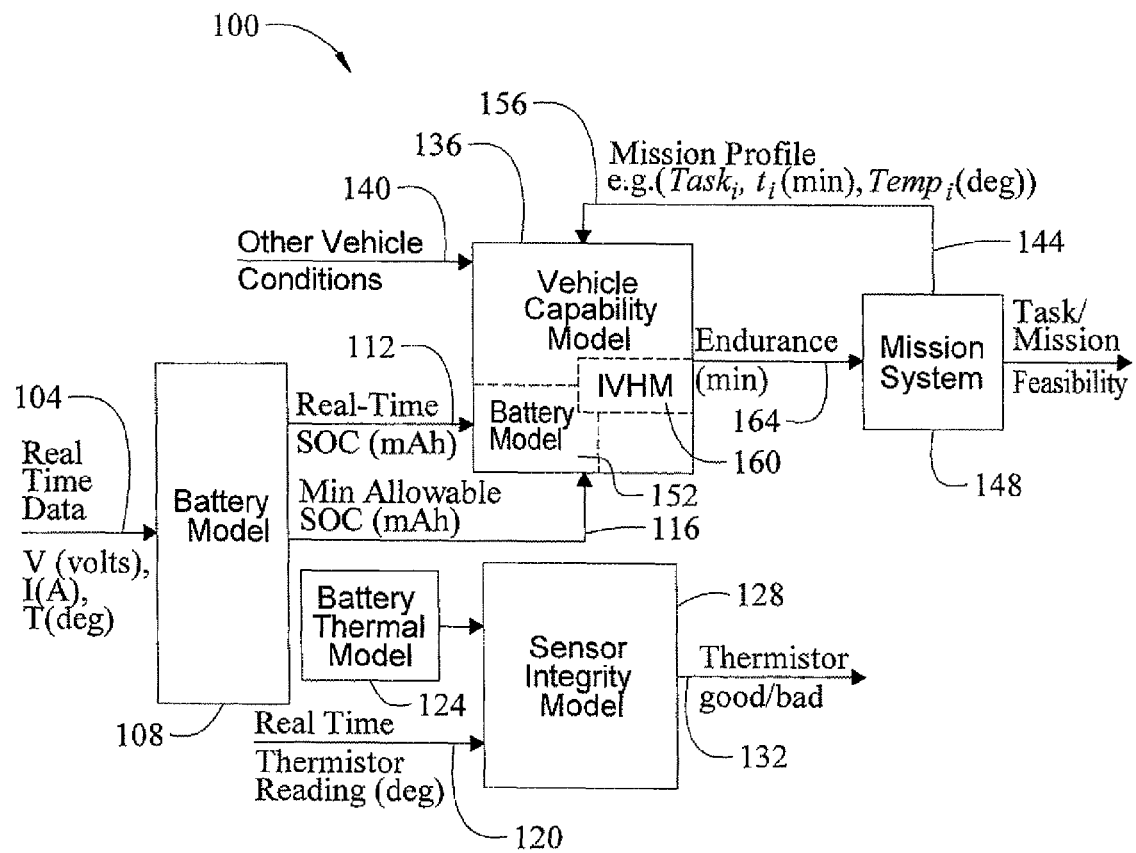
FIG. 2 is a diagram of models used by transponder module processor(s) in a method of determining aircraft conditions and capabilities in accordance with one implementation of the disclosure.

In one exemplary implementation, a transponder module determines conditions of components and subsystems of an aircraft. The determined conditions may be used in determining capabilities of the aircraft, for example, as shall now be discussed with reference to FIG. 2. A diagram of models used by transponder module processor(s) in implementing a method of determining aircraft conditions and capabilities is indicated generally in FIG. 2 by reference number 100. For purposes of providing an example, modeling of a battery of the aircraft is shown in and discussed herein with reference to FIG. 2. Although other components and subsystems of the aircraft are not discussed in detail, it should be understood that the same or similar methods as those discussed with reference to the battery may be applied in relation to other components and/or subsystems of the aircraft.

In the present example, the aircraft battery is monitored to provide real-time battery diagnostics and prognostics. Real-time sensor data received via the input interface 24 (shown in FIG. 1) includes battery voltage, battery current, and battery temperature, indicated collectively in FIG. 2 by reference number 104. The sensor data 104 are input to a battery model 108, which is implemented to determine a real-time state-of-charge (SOC) 112, e.g., in milliamp hours (mAh) and a minimum allowable state-of-charge (SOC) 116, e.g., in milliamp hours (mAh). It should be noted that although various units of measurement are mentioned in the disclosure and shown in the Figures, the disclosure is not so limited.

Sensor data received via the input interface 24 also includes a reading 120 from a thermistor that measures battery temperature. The thermistor input 120 and a battery thermal model 124 are used in a sensor integrity model 128, which is implemented to determine whether the thermistor from which the reading 120 was obtained is operating properly. Implementing the sensor integrity model 128 results in an output 132 indicating the thermistor condition, e.g., whether the thermistor is good or bad. The diagnostic output 132 may be used in other or additional modeling and/or algorithmic calculations and may be input as one of a plurality of vehicle conditions to a vehicle capability model 136.

The vehicle capability model 136 is used to model relationship(s) between aircraft conditions and dynamic and payload capabilities of the aircraft. Thus the capability model 136 is implemented using information as to aircraft conditions. Condition-related information used in the capability model 136 includes, without limitation, condition data 140 for other subsystems of the aircraft, as well as the state-of-charge condition data 112 and 116 for the battery. The condition data 140 for other subsystems and components may be determined in various ways, including but not limited to model-based methods as previously discussed.

The capability model 136 may receive input 144 from a mission system model 148 that describes, e.g., a mission profile. A mission profile may include tasks and their duration, e.g., take-off, land, waypoint flight, running a sensor, running a communication link for a certain duration. The mission profile may also include environmental parameters, e.g., an ambient temperature profile. A profile might specify, for example, that the aircraft is to fly in freezing temperatures for a certain duration, and then in a milder environment for a certain duration.

Included in the capability model 136 is a model 152 for modeling capabilities of the battery in relation to overall vehicle capabilities. Data used in the capability model 136 includes, among other things, current and/or power consumption and minimum operating voltage of various sensors of the aircraft. The sensor inputs can be used in the capability model 136, for example, to determine a discharge profile (e.g., expressed as current versus time) for the battery based on an input mission profile 156. The capability model 136 may also include a thermal model of the battery that may be used to predict battery temperature based on a discharge profile.

The capability model 136 may be adjusted substantially continuously in accordance with real-time integrated vehicle health monitoring (IVHM) diagnostic data 160 from an IVHM system of the aircraft. Capability adjustments determined in the capability model may be provided, e.g., to the mission system model 148, in which feasibility of tasks and/or a mission may be adjusted to account for the change in capability. For example, if a motor of the aircraft is determined to be drawing increased current due to increased friction, the capability model 136 may determine endurance 164 based on the increased motor power consumption. The revised (in this case, decreased) endurance may be used in the mission system model 148 to change a feasibility evaluation for a task and/or mission.

Other subsystems of the aircraft may be modeled in ways similar to those described above for the battery to provide the condition data 140 for the other subsystems to the capability model 136. It should be noted generally that vehicle subsystem behavior and conditions, as well as relationships among vehicle conditions and vehicle capabilities, may be determined in various ways including, in addition to, or instead of modeling as shown above.

Referring again to FIG. 1, the module 20 may output information as to vehicle conditions and capabilities via the wired and/or wireless output interface 44 to one or more systems or subsystems, including but not limited to subsystem(s) of the vehicle itself. Output parameters can, e.g., be defined by a user or selected from a predefined list. Features of output parameters such as engineering units, update rate, and/or other information describing the parameter information may be included with the parameter definition. Output parameter features are communicated along with actual parameter values, e.g., to user(s) of the information. Examples of output parameter features include: "'Minimum turn radius at current time' units=feet, update rate=1 second" and "'Minimum turn radius 10 minutes from current time', units=feet, update rate=1 minute".

Figure 3:
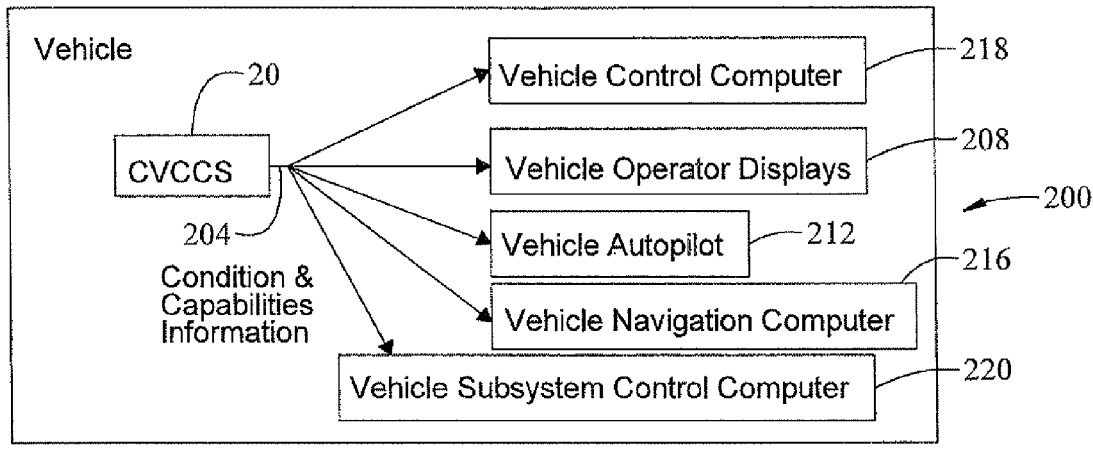
FIG. 3 is a diagram of a vehicle in which transponder module information is used in accordance with one implementation of the disclosure.

Information from a transponder module 20 may be used onboard and/or off-board a vehicle that includes the module. A diagram of a vehicle in which transponder module information is used is indicated generally in FIG. 3 by reference number 200. Condition and capability information 204 from the module 20 (occasionally referred to in the disclosure as "Common Vehicle Condition and Capabilities System", or "CVCCS") is output, e.g., to operator displays 208, an autopilot 212, a navigation computer 216, a vehicle control computer 218, and/or a vehicle subsystem control computer 220 of the vehicle.

Figure 4:
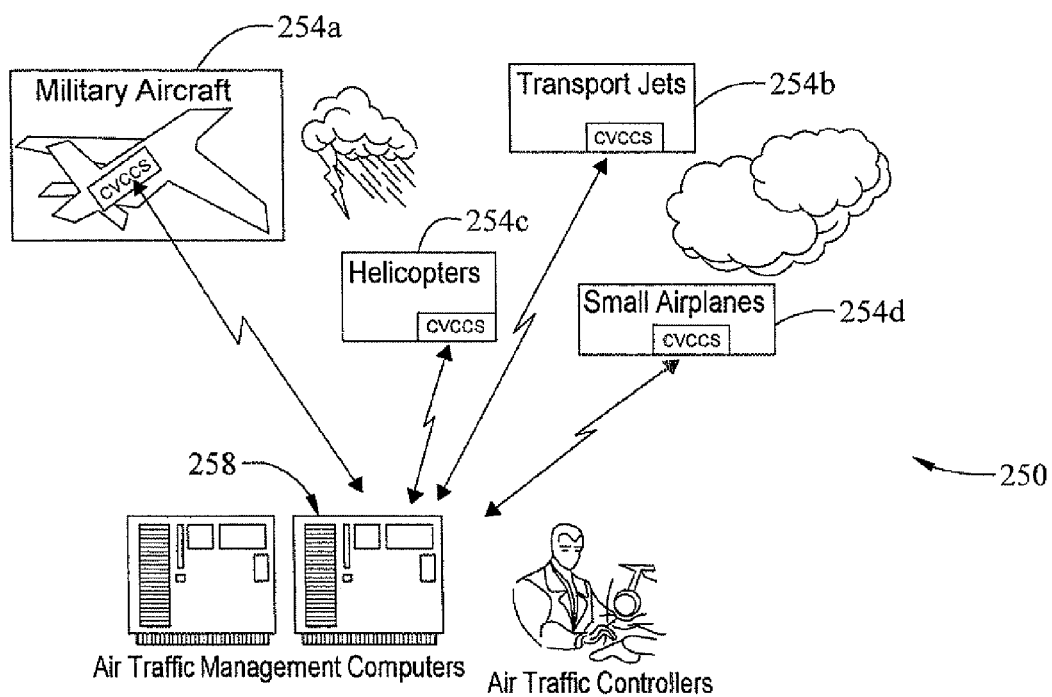
FIGS. 4 and 5 are diagrams illustrating use of transponder module information off-board a vehicle in accordance with one implementation of the disclosure.
Figure 5:
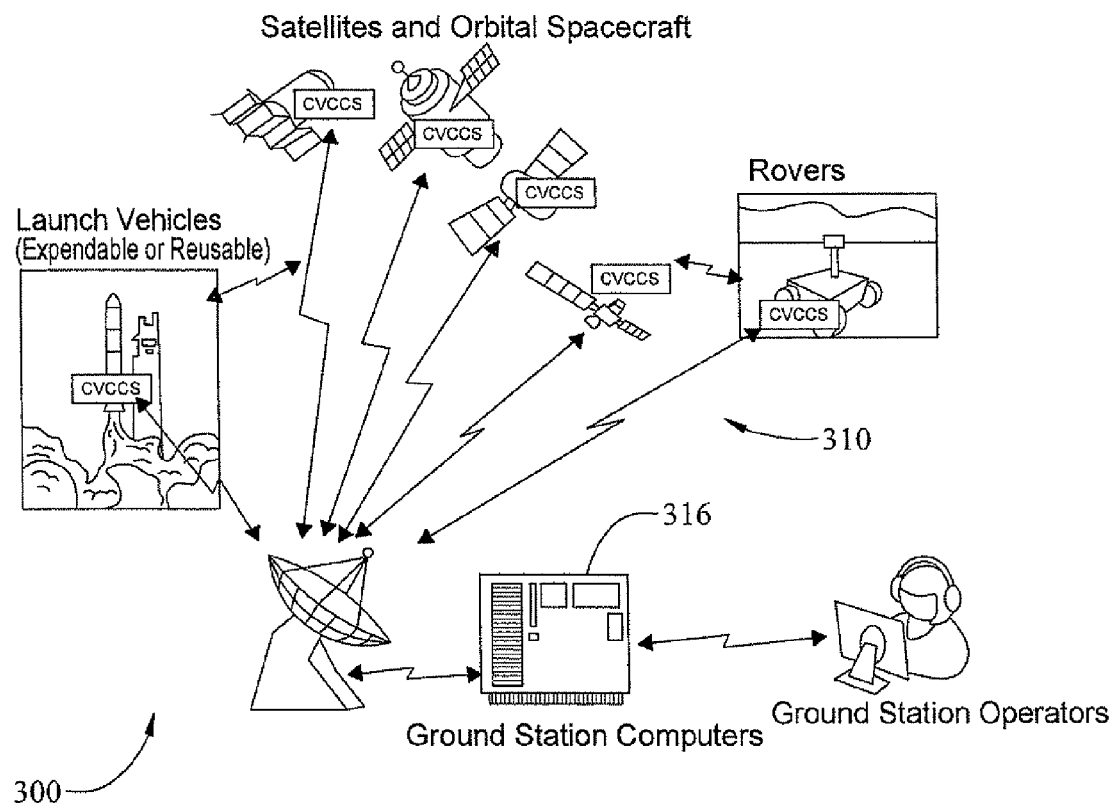

A diagram illustrating use of transponder module information off-board a vehicle is indicated generally in FIG. 4 by reference number 250. Aircraft 254a-254d transmit transponder module information to computers 258 for use, e.g., by air traffic controllers. It should be noted that the aircraft 254a-254d are of different types, i.e., military aircraft 254a, transport jets 254b, helicopters 254c, and small airplanes 254d. Another use of transponder module information off-board a vehicle is indicated generally in FIG. 5 by reference number 300. Launch vehicles, satellites, orbital spacecraft, and space rovers collectively numbered 310 transmit transponder module information to ground station computers 316 for use by ground station operators.

Figure 6:
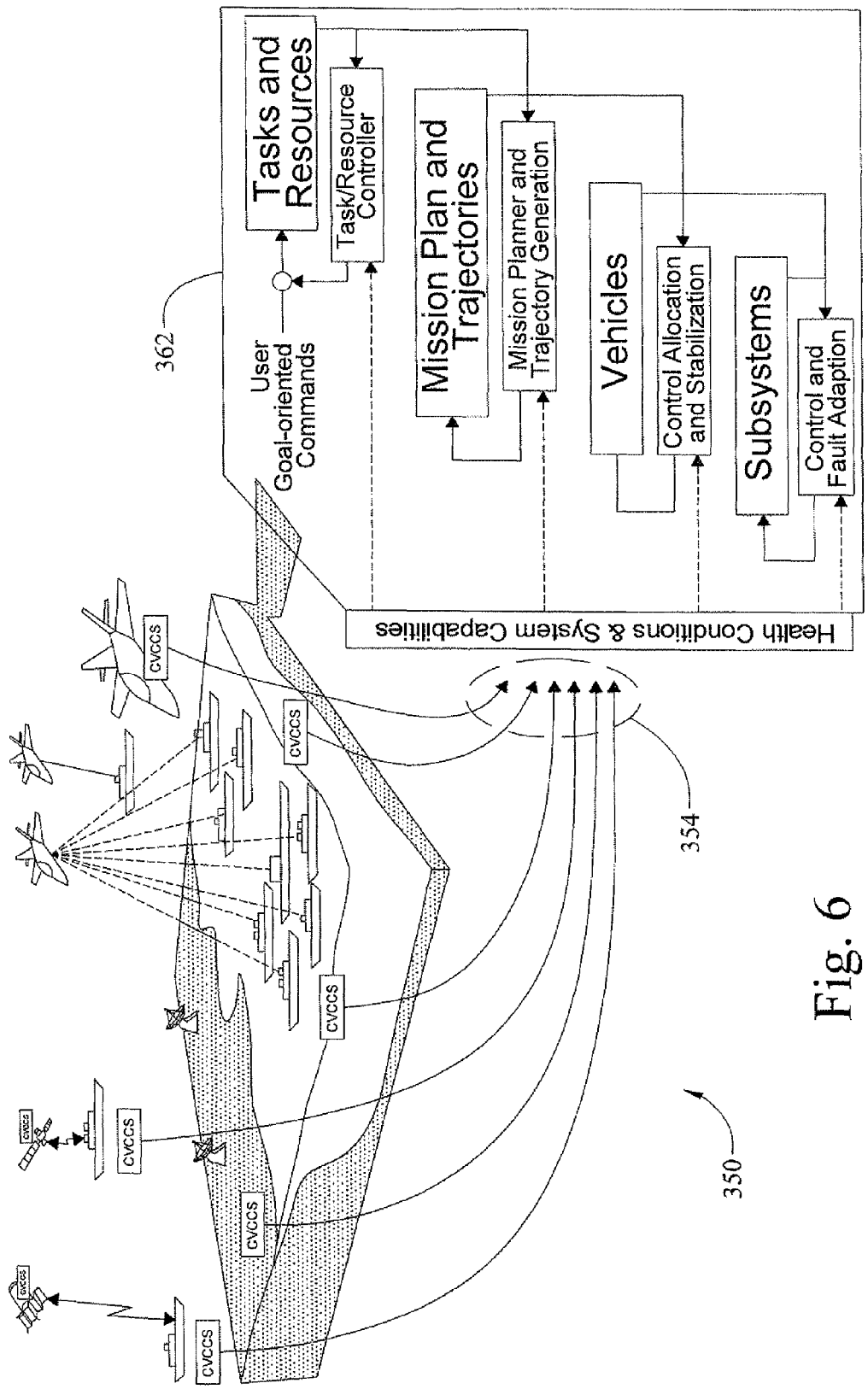
FIG. 6 is a diagram illustrating use of transponder module information to support autonomous operations of a plurality of vehicles in accordance with one implementation of the disclosure.

A diagram illustrating use of transponder module information to support autonomous operations of a plurality of vehicles is indicated generally in FIG. 6 by reference number 350. Information 354 as to conditions and capabilities of aircraft, watercraft and other vehicles collectively numbered as 358 is transmitted to a mission planning system 362. Vehicle condition and capabilities information may be used, e.g., in assigning tasks to the vehicles, mission task planning, vehicle navigation planning (e.g., in relation to time/space trajectory planning for an aerial vehicle), control adaptation in response to degraded or changed vehicle capabilities, remaining useful life contingency planning, and other or additional health-adaptive command and control functions.

Figure 7A:
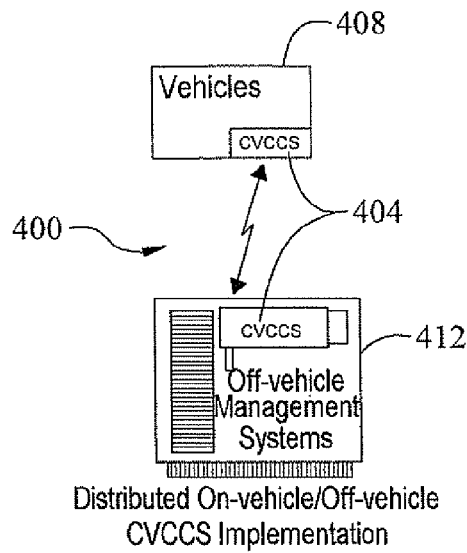
FIG. 7A is a diagram illustrating distribution of transponder module functions between a vehicle and a system off-board the vehicle in accordance with one implementation of the disclosure.

Based on the type of vehicle configured with a transponder module 20, the module itself may be completely onboard a vehicle, e.g., fully contained in a single line replaceable unit (LRU), or distributed among the vehicle, vehicle subsystems, and/or ground based systems. A diagram illustrating distribution of transponder module functions between a vehicle and a system off-board the vehicle is indicated generally in FIG. 7A by reference number 400. Various computing functions of a transponder module 404 may be distributed between a vehicle 408 and one or more management systems 412.

Figure 7B:
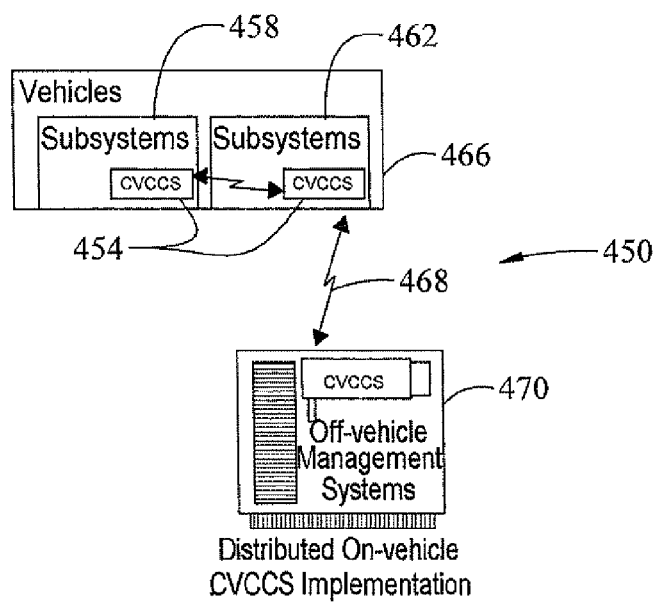
FIG. 7B is a diagram illustrating distribution of transponder module functions between subsystems of a vehicle in accordance with one implementation of the disclosure.

A diagram illustrating another distribution of transponder module functions is indicated generally in FIG. 7B by reference number 450. Various transponder module functions 454 may be distributed between subsystems 458 and 462 of a vehicle 466. Condition and capabilities information 468 is sent to one or more management systems 470. Vehicle subsystems 458 and/or 462 may include one or more actuators for use in operating the vehicle 466. In such case, operational control of the vehicle 466 may be modified in response to transponder module condition and capabilities information.

Various implementations of the disclosure provide local (i.e., on-board) condition and capability information for safety-critical decision-making and control adaptation within a vehicle control system. A mission command and control system can dynamically assign a plurality of vehicles of various types to perform specific tasks based on individual vehicle conditions and capabilities. Implementations of the disclosure provide information that enables management of vehicle operations by humans and, additionally or alternatively, autonomous mission management and task planning devices. Information provided by such a system is also useful for optimal planning of vehicle maintenance.

In some implementations, it is contemplated that air, ground, and space vehicles would be configured as modular multi-use platforms. A given vehicle, then, might be reconfigurable, e.g., as a transport vehicle, surveillance sensor platform, and/or weapons delivery vehicle. Airplanes and helicopters are contemplated as modular systems composed of fuselage/payload, engines, wings, avionics, mission systems, and sensors. Reusable launch vehicle spacecraft could also be modular systems composed of main engines, solid rocket boosters, external tank, thermal protection systems, and a variety of crew station and other payload and mission modules attached via common adapter interfaces. Orbiter spacecraft, such as satellites, may also be modular in that they are composed of a primary frame structure, engines, major subsystems consisting of power supply and distribution systems, navigation systems, onboard processing systems, thermal management systems and payload consisting of fuel, weapons system, optics, command and telemetry communication systems, and/or scientific instruments. The ability to know the capabilities of a vehicle based on its configuration can be highly valuable if not essential in mission planning and networked operation of reconfigurable multi-role platforms. In various implementations of the disclosure, the capabilities of such reconfigurable vehicles can be computed using input signals from the vehicle modular systems and vehicle type information stored in memory.

Air vehicles are also contemplated as having shape-changing (morphing) capabilities. As a vehicle morphs, its capabilities (e.g., turn radius, endurance, etc.) can change dramatically in a very short amount of time. The ability to know the capabilities of such a vehicle in real-time can be highly valuable if not essential for mission planning and autonomous operations. In various implementations of the disclosure, capabilities of such a vehicle can be computed in realtime based on its morphed state. Thus, vehicle control, mission planning, and autonomous operation can be performed in an optimal manner.

Figure 8:
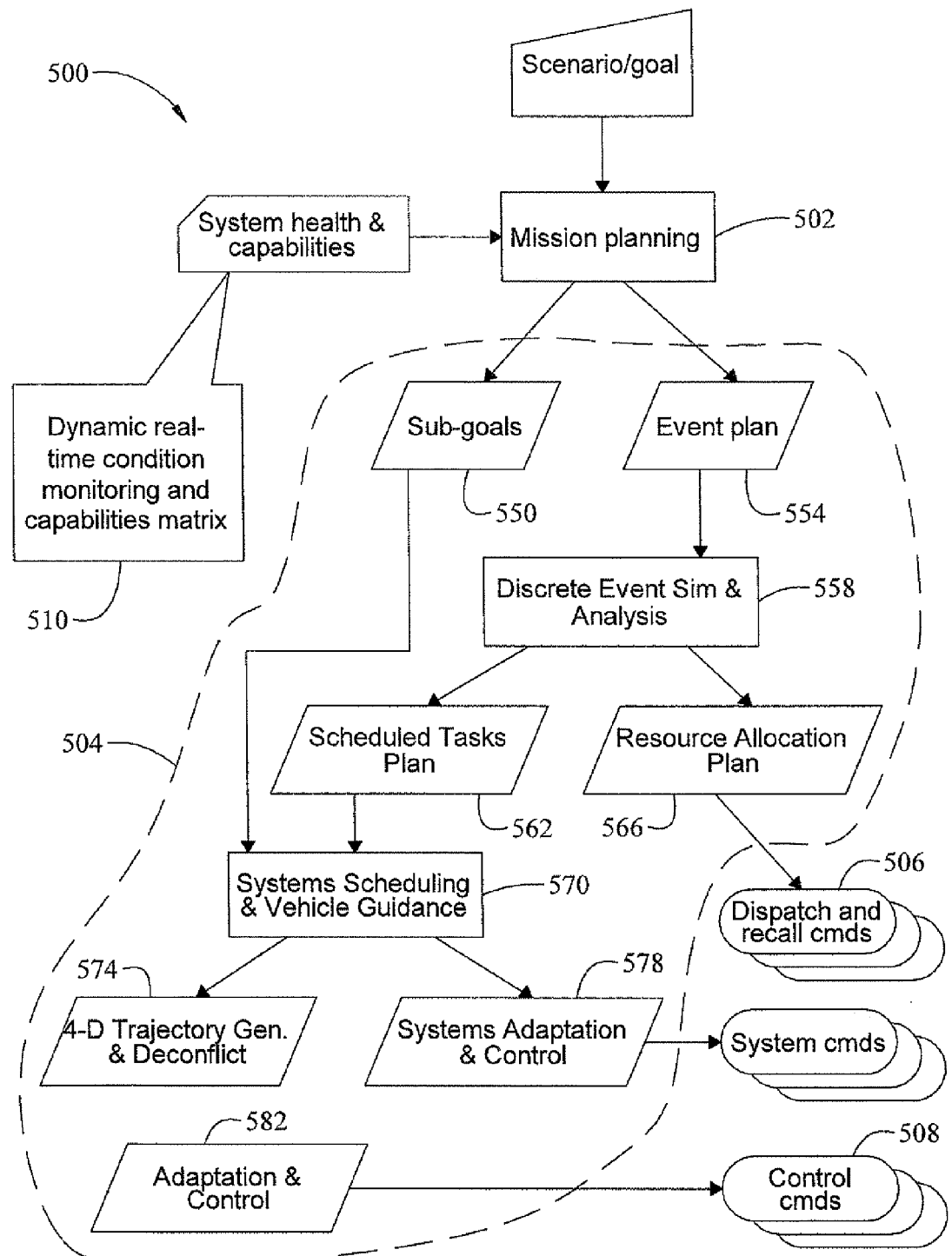
FIG. 8 is a diagram of a mission control hierarchy that uses transponder information in a planning function that assigns tasks and issues commands to vehicles in accordance with one implementation of the disclosure.

An architecture and functional elements to perform health-based mission planning, resource allocation, and task allocation is indicated generally in FIG. 8 by reference number 500. In the present implementation, a condition and capabilities matrix 510 including vehicle condition and capabilities information is used by a mission planning function 502 that communicates with a plurality of vehicles available as resources in a mission. Each vehicle is configured with a transponder module as previously described. An agent-based process of determining vehicle condition and capabilities may be used to determine the condition and capabilities information included in the matrix 510. The matrix 510 is shown in greater detail in FIG. 9.

Referring again to FIG. 8, the mission planning function 502 communicates with optimization functions indicated generally by reference number 504. Optimization functions 504 may be used in combination, e.g., to compute dispatch and recall instructions 506 to vehicles and command signals 508 to vehicle systems and controllers. Optimization functions 504 may include, but are not limited to, programs that compute sub-goals 550, event plans 554, simulation analysis 558, task plans 562, resource allocation 566, systems schedules and vehicle guidance 570, trajectories 574, systems adaptation 578, and vehicle and flight adaptation and control 582.

Figure 9:
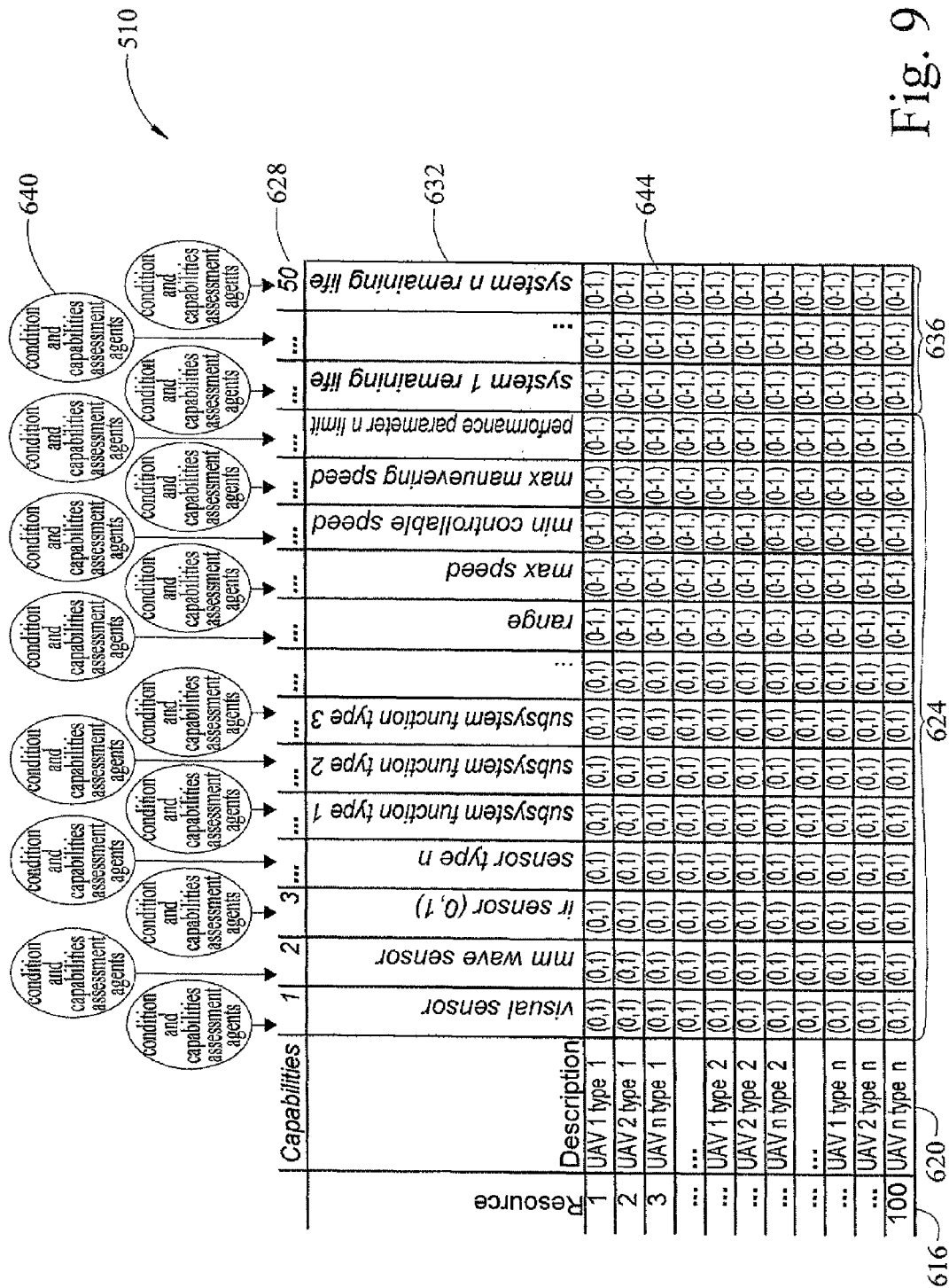
FIG. 9 is a diagram illustrating transponder information for a plurality of vehicles in a matrix useful in optimization of tasking and control of vehicles in accordance with one implementation of the disclosure.

Referring now to FIG. 9, mission resources are vehicles, which may be of different types. Resources are identified by number in a column 616 and described in a column 620. Capabilities 624 for each vehicle are identified by number in a row 628 and described in a row 632. Conditions 636 for each vehicle also are identified by number in the row 628 and described in the row 632. Software agents 640 obtain condition and capabilities information from the transponder module of each vehicle. The information is used to update cells 644 of the matrix in real time. Thus the matrix 510 provides a mission-wide view of vehicle capabilities and conditions in real time.

Various implementations of the foregoing transponder modules and systems can be used in many different environments, including but not limited to air traffic management. An ability to provide vehicle condition, vehicle capabilities, or any combination thereof, to air traffic controllers can enhance the efficiency and safety of air transportation. Furthermore, vehicle condition and capabilities information provided by the foregoing transponder module and system can promote safe and optimal performance of air traffic management advisory systems and autonomous air traffic management systems.

Marine traffic management is another environment in which implementations of the foregoing transponder module and system configurations can be useful. The ability to provide vehicle condition, vehicle capabilities, or any combination thereof to maritime vehicle captains, maritime traffic controllers, emergency responders, or any combination thereof, can enhance the efficiency and safety of maritime vessels.

The disclosure can also be implemented in relation to personal automobile, highway transport vehicle, and highway traffic management. The ability to provide automobile condition and capabilities, highway transport vehicle condition and capabilities, or any combination thereof, to vehicle drivers, vehicle autonomous subsystems, and highway traffic management systems can enhance the efficiency and safety of highway transportation.

Implementation is also contemplated in connection with heterogeneous teams of vehicles used, e.g., in disaster relief, search and rescue, security, and/or defense applications. The ability to provide vehicle condition and capabilities information to mission strategists, task assignment schedulers, vehicle mission and trajectory planners, vehicle control distributors, subsystem control adaptation, or any combination thereof, can enhance the probability of achieving overall mission objectives. Furthermore, the providing of vehicle condition and capability information to such adaptive systems makes it possible to calculate a theoretical probability of mission success.

Inhabited and Uninhabited Aircraft and Spacecraft

The ability to provide aircraft condition and capabilities information to pilots or autonomous flight management systems can enhance the efficiency, safety, and mission reliability of aircraft operations. The ability to provide spacecraft condition and capabilities information to crew and/or ground station operators as well as to autonomous mission management systems can enhance the efficiency, safety, and mission reliability of spacecraft operations. In addition, condition and capabilities monitoring of reusable launch vehicles can help meet needs of quick-turnaround "aircraft-like reusable access to space." For instance, reusable launch vehicle maintenance and asset launch scheduling may be performed based on the transponder-module-monitored capabilities of each individual vehicle to perform a given payload and orbit mission type. Also, on-orbit refueling, reconfiguring, or repair of otherwise expendable satellites could be performed by one or more refuel/repair spacecraft in an optimized manner by coordinating the repositioning of satellite constellations, each with known limited fuel supply (range) and maneuverability, to minimize the overall system cost of performing the repositioning task while ensuring that all rendezvous points are achievable, the desired refuel/repair is completed in the allotted time, and the overall satellite constellation continues to meet functional requirements.

Planning missions, assigning tasks to vehicles, and coordinating events in multi-vehicle operating environments can be optimized when knowledge of individual vehicle component conditions and vehicle capabilities is made available. In various implementations of the disclosure, this information can be provided from a variety of vehicles and vehicle types in a standard form.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. Further, it should be understood that unless the context clearly indicates otherwise, the term "based on" when used in the disclosure and/or the claims includes "at least partly based on", "based at least in part on", and the like.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method of using one or more vehicles to perform a mission, the method comprising:
   using a remotely located system to receive, from a transponder module of each of the one or more vehicles, information describing a plurality of current subsystem conditions and a plurality of current capabilities of each vehicle;
   using the remotely located system to evaluate the information, in real time, to enable the remotely located system to update conditions and capabilities for each vehicle in a mission capabilities matrix;
   using the remotely located system to transmit additional information, in real time, to at least one of the one or more vehicles, based on the updated matrix, that facilitates performing one or more of the following:
      controlling at least a component of the at least one of the one or more vehicles;
      modifying a task of the at least one of the one or more vehicles; and
      modifying the mission.

2. The method of claim 1, wherein a plurality of vehicles are used, the vehicles being of different types.

3. The method of claim 1, wherein the mission includes one or more of the following: air traffic management, maritime traffic management, road vehicle traffic management, and space traffic management.

4. The method of claim 1, comprising including the transponder module in a line replaceable unit (LRU) of one of the one or more vehicles.

5. The method of claim 1, wherein the controlling is performed by the one of the one or more vehicles.

6. A system for performing a mission comprising:
   a plurality of vehicles to which one or more tasks of the mission are assigned, each vehicle having a transponder module configured to provide information in real time describing a plurality of current subsystem conditions and a plurality of current capabilities of the vehicle; and
   a mission control system located remotely from the plurality of vehicles and having at least one processor and memory configured to receive the information from the plurality of vehicles in real time from the vehicle transponder modules, and based on an evaluation of the information, to communicate additional information to at least a selected one of the plurality of vehicles to perform one or more functions in real time to modify a task of the selected one of the vehicles to thus optimize the mission.

7. The system of claim 6, the at least one processor and memory further configured to issue a control command to control one of the vehicles.

8. The system of claim 6, wherein the vehicles are heterogeneous.

9. A method of using one or more vehicles to perform a mission, the method comprising:
   using a remotely located system to receive, from a transponder module of each of the one or more vehicles, information describing a plurality of current subsystem conditions and a plurality of current capabilities of each vehicle;
   using the remotely located system to evaluate the information, in real time, to determine that an operational capability of a selected one of the one or more vehicles has become degraded, and updating a mission and capabilities matrix maintained by said remotely located system for each vehicle, to reflect said degraded operational capability of said selected one of the one or more vehicles; and
   using the remotely located system to transmit additional information to at least a different one of the one or more vehicles, based on the updated matrix, to modify an operation of the different one of the one or more vehicles to account for the degraded operational capability of the selected one of the one or more vehicles.

* * * * *